United States Patent
Pantaloni

(10) Patent No.: US 10,311,269 B2
(45) Date of Patent: Jun. 4, 2019

(54) METHOD AND SYSTEM FOR IMPROVING THE READING EFFICIENCY OF RFID TAGS

(71) Applicant: NEOPOST TECHNOLOGIES, Bagneux (FR)

(72) Inventor: Jean-Baptiste Pantaloni, Aix-en-Provence (FR)

(73) Assignee: Neopost Technologies, Bagneux (FR)

( * ) Notice: Subject to any disclaimer, the term of this patent is extended or adjusted under 35 U.S.C. 154(b) by 0 days.

(21) Appl. No.: 15/997,260

(22) Filed: Jun. 4, 2018

(65) Prior Publication Data

US 2018/0349657 A1    Dec. 6, 2018

(30) Foreign Application Priority Data

Jun. 5, 2017   (EP) ..................................... 17174437

(51) Int. Cl.
    *G06K 7/00*           (2006.01)
    *G06K 7/10*           (2006.01)
    *G06K 19/07*         (2006.01)

(52) U.S. Cl.
    CPC ....... *G06K 7/10366* (2013.01); *G06K 7/0008* (2013.01); *G06K 7/10178* (2013.01); *G06K 19/0723* (2013.01)

(58) Field of Classification Search
    CPC ....................... G06K 7/10366; G06K 19/0723
    See application file for complete search history.

(56) References Cited

U.S. PATENT DOCUMENTS

| | | | |
|---|---|---|---|
| 5,767,789 A * | 6/1998 | Afzali-Ardakani | ......................... G06K 7/10178 340/10.1 |
| 7,388,500 B2 * | 6/2008 | Chang | .................. G06K 7/0008 340/539.21 |
| 8,842,056 B2 * | 9/2014 | Batchelor | .......... H01Q 15/0066 343/909 |
| 2003/0197653 A1 * | 10/2003 | Barber | ..................... H01Q 1/36 343/742 |

(Continued)

FOREIGN PATENT DOCUMENTS

EP          1693807 A1     8/2006

OTHER PUBLICATIONS

European Search Report, dated Nov. 27, 2017, for EP 17174437, 2 pages.

*Primary Examiner* — Seung H Lee
(74) *Attorney, Agent, or Firm* — Cozen O'Connor

(57) ABSTRACT

A method and structure improves a reading efficiency for RFID tags located in a reading zone of a RFID reading apparatus. A structure is interposed between the RFID tag(s) and the RFID reading apparatus. The structure is essentially electrically non-conductive and comprises a network of RFID antennas. The network of RFID antennas network is positioned on the structure in a pattern whose periodicity in two dimensions is less than half an operating RFID wavelength, so as to create a three dimensional interferometric pattern with peaks of electromagnetic field intensities. The RFID reading apparatus or the at least one RFID tag is set in motion, relatively to one another. The at least one RFID tag is read by the RFID reading apparatus during the relative motion within the reading zone so that the three dimensional interferometric pattern shifts and thereby improves the reading efficiency.

24 Claims, 2 Drawing Sheets

(56) References Cited

U.S. PATENT DOCUMENTS

2004/0227682 A1 11/2004 Anderson
2008/0150691 A1 6/2008 Knadle et al.

* cited by examiner

METHOD AND SYSTEM FOR IMPROVING THE READING EFFICIENCY OF RFID TAGS

FIELD OF THE INVENTION

The present disclosure relates to the identification and tracking of items and more particularly to radiofrequency identification data (RFID) systems designed for detecting RFID tags within a moving vehicle.

BACKGROUND

Today's business practices often require that items be identified and traced during their transport. Generally, an identification data device attached to each item to be traced is required. For productivity purposes, such an ID device needs to be read remotely and automatically by electronic readers. Automation reduces errors in information capture and allows for more accurate and more regular tracking management.

Radio frequency identification (RFID) is a preferred solution as radiofrequency communication allows a diffuse transmission and is tolerant to RFID devices being hidden, as opposed to optical solutions, which are more directional and quite intolerant to blocking bodies lying in the transmission path. The use of RFID tags is an efficient and economical method for systems for tracking and tracing items. Often, RFID tags are attached to pallets used for transporting items, and are used for identifying the pallets. When items are transported by a vehicle, for example such as a truck, it is convenient to identify these items as the vehicle goes through a reading zone. RFID apparatus can be designed to read RFID tags affixed onto pallets or onto items, which are loaded into a transporting vehicle, as the vehicle goes through the reading zone of such RFID reading apparatus. For economic reasons, passive RFID tags are preferred as they are lower cost and smaller because they have no battery, as opposed to active RFID tags, which are battery-assisted. A RFID gate is a typical example of such a RFID reading apparatus, which reads RFID tags affixed onto pallets or onto items loaded into a vehicle as the vehicle goes through the RFID gate.

However, when a vehicle goes through the reading zone of the RFID gate, sometimes, some passive RFID tags are not read. The primary cause for a RFID gate not being able to read a passive RFID tag is that the power provided by the RFID gate is not sufficient for energizing the passive RFID tag. Once the passive RFID tag has been energized, a RFID gate is generally sensitive enough for detecting deem signals emitted by the passive RFID tag. Typical issues impacting the reading efficiency of RFID gate are the shadowing effects of materials lying in the emission path of the RFID antennas or the dis-adaptation of a RFID tag because of an underlying conductive surface such as a metal surface. As a result, a system and a method improving the reading efficiency of passive RFID tags by a RFID gate and more generally by a RFID reading apparatus would be highly beneficial.

OBJECT AND DEFINITION OF THE INVENTION

The object of the invention consists therefore in overcoming the issues described above. This object is achieved by providing a method for improving the reading efficiency of at least one RFID tag in a reading zone of a RFID reading apparatus at an operating RFID wavelength, including:

interposing between the at least one RFID tag and the RFID reading apparatus a structure, which is essentially electrically non-conductive and which comprises a RFID antennas network adapted for the operating RFID wavelength, wherein the RFID antennas network is positioned on said structure according to a pattern whose periodicity in the two dimensions is less than half said operating RFID wavelength so as to creates a three dimensional interferometric pattern with peaks of electromagnetic field intensities, setting in motion the RFID reading apparatus or the at least one RFID tag relatively to the other one, so that the at least one RFID tag is in relative motion within the reading zone of the RFID reading apparatus, reading the at least one RFID tag by the RFID reading apparatus during the relative motion within the reading zone of the RFID reading apparatus so that the three dimensional interferometric pattern shifts and improves the reading efficiency of the at least one RFID tag to be read by the RFID reading apparatus when the position of one of the peaks of electromagnetic field intensities coincides with the position of the at least one RFID tag.

In a preferred embodiment, the at least one RFID tag and the structure are maintained immobile relative to each other and are mobile relative to the RFID reading apparatus.

In another embodiment, the RFID reading apparatus and the structure are maintained immobile relative to each other and are mobile relative to the at least one RFID tag.

In a particular embodiment, the RFID reading apparatus is stationary and the structure is a tarpaulin of a truck, which moves with the at least one RFID tag present in the truck and wherein the at least one RFID tag is read by the RFID reading apparatus as the truck passes through the reading zone of the RFID reading apparatus.

A practical benefit is to complement and improve existing RFID reading apparatus, without having to change or update existing RFID reading apparatus already installed in the field.

An additional effect is the creation in parallel of an intense evanescent oscillating magnetic field in the vicinity of the RFID tarpaulin, which can energize tags positioned near the tarpaulin.

In another embodiment, the structure is stationary and is enveloping the at least one RFID tag also stationary, and wherein the RFID reading apparatus is a mobile RFID reading apparatus whose reading zone is moved over the structure enveloping the at least one RFID tag.

According to a feature of the invention, the distance between the structure and an emitting RFID antenna of the RFID reading apparatus is more than the operating RFID wavelength.

Advantageously, the at least one RFID tag is a passive tag, and wherein the RFID reading apparatus and the at least one RFID tag and the RFID antennas network operate in the Ultra High Frequency band between 840 MHz and 960 MHz.

The embodiments of the invention also concern a system for improving the reading efficiency of at least one RFID tag in a reading zone of a RFID reading apparatus at an operating RFID wavelength, the system further comprising a structure, which is essentially electrically non-conductive and which includes a RFID antennas network positioned on said structure according to a pattern whose periodicity in the two dimensions is less than half said operating RFID wavelength for creating a three dimensional interferometric pattern with peaks of electromagnetic field intensities, wherein the structure is interposed between the at least one RFID tag and the RFID reading apparatus and wherein the structure is mobile relatively to the at least one RFID tag or to the RFID reading apparatus so that the three dimensional interferometric pattern shifts and improves the reading efficiency of the at least one RFID tag when being read by the RFID reading apparatus and the position of one of said peaks of electromagnetic field intensities coincides with the position of said at least one RFID tag.

In a preferred embodiment, the RFID antennas network comprises a same periodicity in said two dimensions.

Preferably, each antenna of the RFID antennas network has an identical shape.

In a particular embodiment, the RFID reading apparatus is a stationary RFID gate and the structure is a truck tarpaulin.

Advantageously, the RFID antennas are manufactured separately from the tarpaulin and then glued onto the tarpaulin, and the RFID antennas are made of copper, aluminum, meta-materials or any other electrically conductive materials According to a feature of the invention, the RFID antennas are printed onto the tarpaulin with conductive ink.

According to another feature of the invention, the RFID reading apparatus, the at least one RFID tag and the RFID antennas network operate in the Ultra High Frequency band between 840 MHz and 960 MHz.

The invention also relates to a truck tarpaulin, which structure is essentially electrically non-conductive comprising a RFID antennas network positioned on said structure according to a pattern whose periodicity in the two dimensions is less than half said operating RFID wavelength for creating a three dimensional interferometric pattern with peaks of electromagnetic field intensities, when said truck tarpaulin is placed next to a RFID reading apparatus.

BRIEF DESCRIPTION OF THE DRAWINGS

Other aspects, features and advantages of the teachings of the invention will become clearer to those ordinary skilled in the art upon review of the following description in conjunction with the accompanying drawings where.

DETAILED DESCRIPTION

Figure 1:
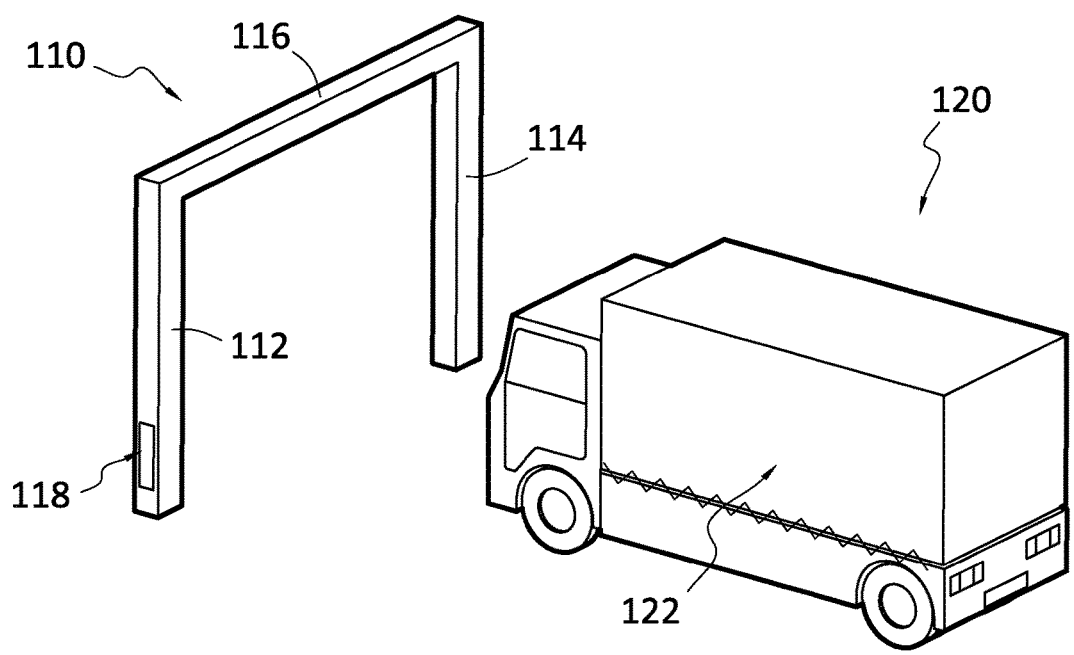
FIG. 1 is an isometric view showing a RFID gate for reading RFID tags within the load volume of a truck.

The various embodiments of the invention are particularly useful for carriers who need to track items or pallets transported by their trucks and therefore use RFID reading apparatus for reading the passive RFID tags affixed onto the items or the pallets. A typical RFID reading apparatus for reading RFID tags on items or pallets loaded into a truck is a RFID gate including a RFID reader connected to antennas positioned on the gate as illustrated on FIG. 1.

Such a RFID gate is constituted of two poles 112 and 114 connected by a transverse beam 116. The RFID gate comprises RFID antennas, which are used for emitting a RFID signal in the direction of the RFID tags to be read and for receiving a RFID response emitted by the RFID tags. The RFID antennas can be comprised in the poles or the transverse beam. Distributing the RFID antennas in both the poles as well as in the transverse beam improves the efficiency of the RFID reading apparatus, and often two antennas are comprised in each pole and as well as two antennas in the transverse beam. All the RFID antennas are connected to a RFID reader 118, which typically is comprised in one of the poles in a position authorising a good accessibility for an operator. The RFID antennas generate a radiation field defining a reading zone under the RFID gate. The RFID tags present in the truck 120 are read by the RFID gate when the truck passes through the reading zone of the RFID gate. The load volume of regular transport trucks are generally covered with a tarpaulin 122, which as an electrically non-conductive material is an appropriate material for RFID technology as RFID signals can go through typical tarpaulin. RFID technology would not be appropriate for truck covered with electrically conductive material such as metal. RFID gates are used for checking on the loading or unloading of trucks and during the transit and transfer of loads. RFID gates can be used indoor or outdoor. Other structures for the RFID gate can also be used. For example the RFID gate can be limited to a structure with two poles, or even to only one pole 112 in a configuration that is traditionally called a totem.

Figure 2:
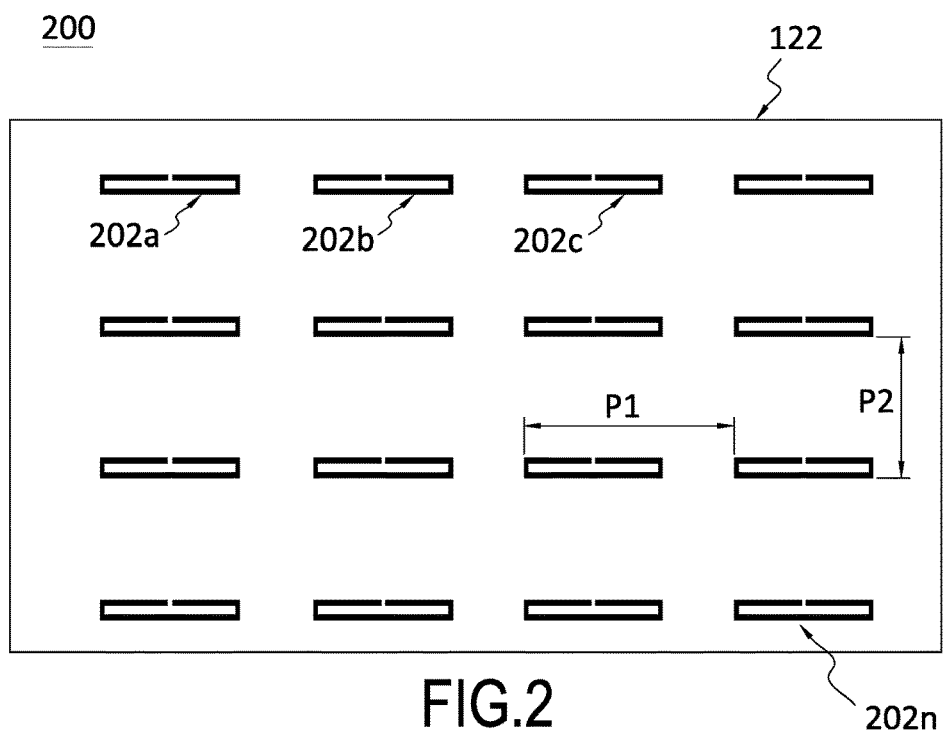
FIG. 2 is a plan view that illustrates a RFID tarpaulin embodying the invention.

According to at least one embodiment of the invention and as illustrated on FIG. 2 a RFID antennas network 202 is positioned on the tarpaulin 122 in accordance with a periodic pattern, for forming a RFID tarpaulin 200. The effect of such a RFID tarpaulin embedding an antennas network is to redirect and re-concentrate the radiation generated by a RFID gate or other reading apparatus for reading the RFID tags within the truck in a similar way as it would be done by an interferometric system.

The RFID tarpaulin 200 is designed to operate in the Ultra-High Frequency (UHF) band between 840 MHz and 960 MHz, widely used for passive RFID tags, and more particularly, in Europe, in the unique allotted band 866-869 MHz, or in USA in the corresponding band 902-928 MHz. The corresponding operating RFID wavelengths are between 32 cm and 34 cm. The RFID antennas 202a-202n are positioned on the tarpaulin 122 according to a pattern whose periodicity P1, P2 in the two dimensions is less than half the operating RFID wavelength, i.e. less than 16 cm (it must be noted that a same periodicity in the two dimensions is not mandatory). Each elementary antenna 202a-202n is a simple folded dipole particularly appropriate for easy manufacturing. It will be understood by those skilled in the art that any antenna shape can be used for the invention as long as this antenna is designed to be adapted to the RFID frequency of the RFID reading apparatus used for reading the RFID tags. Although antennas with different shapes can be included on the tarpaulin as long as these antennas are positioned on the tarpaulin according to a periodic pattern, in a preferred embodiment, the shape of the antennas is identical in order to maximize the constructive effect resulting from their interferences. The tarpaulin material of the RFID tarpaulin of the invention is made of electrically non-conductive material such as fabric or plastic. The antennas material is made of electrically conductive material such as copper or aluminum or eventually of meta-materials or other materials known in the art. The antennas can be manufactured within the tarpaulin material or can be printed onto the tarpaulin with conductive ink for example or can be manufactured separately from the tarpaulin and then glued onto the tarpaulin using technologies known in the art.

The effect of the RFID tarpaulin is to create in the load volume of the truck some concentrations of the incident signal generated by the RFID reading apparatus. The RFID antennas network embedded in the tarpaulin to form the RFID tarpaulin modifies the incident RFID wave generated by the RFID reading apparatus and creates a three dimensional interferometric pattern in the reading zone within the truck load volume with peaks and nodes of electromagnetic field intensities. In the space where the peaks of the interferometric pattern are located, the energy concentrated by the RFID tarpaulin is higher than the energy, which is generated by the RFID reading apparatus without the RFID tarpaulin. As a result, the concentrations by the RFID tarpaulin of the incident signal increase the probability for detecting the RFID tags located within the truck when the truck passes through the RFID reading apparatus such as a RFID gate or a RFID totem.

Figure 3:
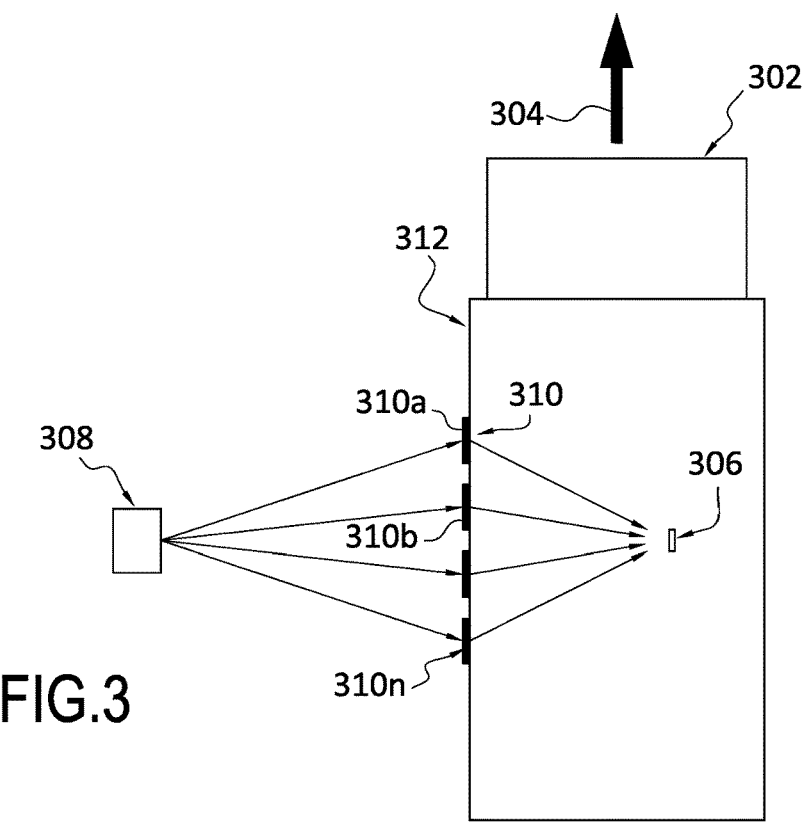
FIG. 3 a schematic diagram that illustrates an embodiment of the principle of the invention.

The principle on how the invention works is represented on FIG. 3 representing only one RFID tag. Obviously, the invention applies for reading a multiplicity of RFID tags within the reading one of the RFID reading apparatus. A truck 302 viewed from the top moves in the direction identified by the arrow 304. A RFID tag 306 is affixed onto an item or a pallet loaded in the truck, and needs to be read by a RFID reading apparatus 308 when the truck 302 goes through the reading zone of the RFID reading apparatus. A RFID antennas network 310, composed of a series of RFID antennas 310a, 310b and 310n, is embedded in the tarpaulin 312 covering the load volume of the truck forming a RFID tarpaulin. When the truck moves through the reading zone of the RFID reading apparatus, each RFID antennas 310a, 310b and 310n of the network 310 embedded in the tarpaulin 312 are energized by the electromagnetic wave generated by the RFID reading apparatus 308. The energized RFID antennas 310a, 310b and 310n then radiate in the load volume of the truck with some phase differences due to the distance differences between each RFID antenna of the RFID antennas network 310 and the emission point of the RFID reading apparatus 308. The radiations of the RFID antennas 310a, 310b and 310n interfere and result in a three dimensional interferometric pattern within the load volume of the truck. As the truck moves in front of the RFID reading apparatus, i.e. through the reading zone of the RFID reading apparatus, the RFID antennas 310a, 310b and 310n embedded in the tarpaulin of the truck also moves compared to the stationary RFID reading apparatus resulting in a shifting three dimensional interferometric pattern within the load volume of the truck. So, as the three dimensional interferometric pattern sweeps through the load volume of the truck, the RFID tag 306 is energized with more efficiency by some energy peaks of the interferometric pattern, particularly when the position of one of the peaks of electromagnetic field intensities coincides with the position of the RFID tag. As a result, the concentrations by the RFID antennas network 310 on the tarpaulin 312 of the incident signal generated by the RFID reading apparatus 308 increase the probability for reading the RFID tag 306 when the truck moves through the reading zone of the RFID reading apparatus.

The effect, and therefore the efficiency, of the antennas network is all the more important as the antennas are more densely organized on the tarpaulin. Preferably, the antennas should be positioned as near as possible from each other, but ensuring that they remain electrically disconnected and that they are positioned periodically so that their radiative emissions interfere in a constructive way resulting in interference peaks.

At least one aspect of the invention has been embodied by a network of simple folded dipoles, however any type of RFID antennas can also be used including any type of loops or fractal antennas. Semiconductors can be included in the design of the RFID antennas network 310. The primary effect of such semiconductors is to produce phase shifts, which impact the interferometric pattern resulting from the interposition of the RFID tarpaulin. The adaptation of such semiconductors powered by current generators can improve the efficiency of the interferometric pattern for reading RFID tags by a RFID reading apparatus. Any type of structure other than a tarpaulin can also be used for supporting the RFID antennas network as long as this supporting structure is essentially electrically non-conductive so that RFID signals can go through the supporting structure and can be conveniently interposed between the RFID reading apparatus and the RFID tag to be read. A preferable support is a thin planar structure, which can be positioned perpendicularly to the emission direction and/or reading direction of the RFID reading apparatus. This planar structure corresponds for example to a RFID tarpaulin attached on a truck.

The various embodiments of the invention have been described for passive RFID tags, which are preferred for economic reasons, but the invention also applies to active RFID tags, which are primarily used in the 433 MHz band corresponding to ISO18000-7. For this particular frequency band, the corresponding operating RFID wavelength is about 68 cm. The RFID antennas are positioned on an essentially electrically non-conductive structure, which can be a tarpaulin, according to a pattern whose periodicity is less than half the operating RFID wavelength, which is in the case of the 433 MHz band is less than 34 cm. When active RFID tags are used, the primary benefit of the interposition of a structure including an RFID antennas network between a RFID tag and the RFID reading apparatus is to modify the RFID wave generated by the RFID tags, therefore creating a three dimensional interferometric pattern in the vicinity of the RFID antennas of the RFID reading apparatus with peaks and nodes of electromagnetic field intensities. The creation of these peaks by the structure including an RFID antennas network increases the probability for the RFID reading apparatus to read the active RFID tags.

Although the embodiments of the invention have been described in the case of a stationary RFID reading apparatus reading mobile RFID tags and more particularly RFID tags within a mobile vehicle, it is to be understood that the invention also applies to a mobile RFID reading apparatus reading stationary RFID tags across a stationary structure, essentially electrically non-conductive, and comprising a RFID antennas network. The mobile RFID reading apparatus can for example be a personal digital assistants ("PDA") or hand-held computer, as described in EP2996191, and including an embedded active RFID module used for reading RFID tags. The stationary structure comprising the RFID antennas network can be an enveloping material such as a bag containing for example items with attached RFID tags or panels of a box containing for example items with attached RFID tags or a cover for the load of a pallet comprising for example items with attached RFID tags. The RFID tags are read by the mobile RFID reading apparatus as the reading zone of the mobile RFID reading apparatus is moved over the stationary RFID tags and stationary structure comprising the RFID antennas network.

The invention has been described with respect to preferred embodiments thereof, however, it will be understood by those skilled in the art that the foregoing and various other changes omissions and deviations in the form and detail thereof may be made without departing from the spirit and scope of this invention. In particular, rather than having the RFID tags and the structure comprising a RFID antennas network maintained immobile relative to each other and being mobile relative to said RFID reading apparatus, the RFID reading apparatus and the structure can be maintained immobile relative to each other and be mobile relative to the RFID tags. For example in the case of a stationary RFID gate, a structure comprising a RFID antennas network can be assembled in front of each emitting RFID antenna of the RFID gate. The interposition of such a structure between RFID tags and the RFID reading apparatus modifies the incident RFID wave generated by the emitting RFID antenna of the RFID gate and creates a three dimensional interferometric pattern in the reading zone of the RFID gate with peaks and nodes of electromagnetic field intensities. In the peaks of the interferometric pattern, the energy concentrations generated by the structure comprising a RFID antennas network increase the probability for detecting RFID tags in motion within the reading zone of the RFID gate. Preferably, the distance between the structure comprising a RFID antennas network and an emitting RFID antenna of the RFID gate is more than the operating RFID wavelength of the RFID gate so that the emitting RFID antenna is not de-adapted by the presence of the RFID antennas network. In the case of the use of a mobile RFID reading apparatus for reading stationary RFID tags, a structure comprising a RFID antennas network can be assembled in front of the mobile RFID reading apparatus. The interposition of such a structure creates a three dimensional interferometric pattern in the reading zone of the mobile RFID reading apparatus with peaks of electromagnetic field intensities. Therefore, the probability for detecting stationary RFID tags by the mobile RFID reading apparatus is increased when the reading zone of the mobile RFID reading apparatus is moved over the stationary RFID tags.

The invention claimed is:

1. A method for improving the reading efficiency of at least one RFID tag in a reading zone of a RFID reading apparatus at an operating RFID wavelength, comprising:
    interposing between said at least one RFID tag and said RFID reading apparatus a structure, which is essentially electrically non-conductive and which comprises a RFID antennas network adapted for said operating RFID wavelength, wherein said RFID antennas network is positioned on said structure according to a pattern whose periodicity in the two dimensions is less than half said operating RFID wavelength so as to creates a three dimensional interferometric pattern with peaks of electromagnetic field intensities,
    setting in motion said RFID reading apparatus or said at least one RFID tag relatively to the other one, so that said at least one RFID tag is in relative motion within said reading zone of said RFID reading apparatus, and
    reading said at least one RFID tag by said RFID reading apparatus during said relative motion within said reading zone of the RFID reading apparatus so that said three dimensional interferometric pattern shifts and improves the reading efficiency of said at least one RFID tag to be read by said RFID reading apparatus when the position of one of said peaks of electromagnetic field intensities coincides with the position of said at least one RFID tag.

2. The method of claim 1, wherein said at least one RFID tag and said structure are maintained immobile relative to each other and are mobile relative to said RFID reading apparatus.

3. The method of claim 1, wherein said RFID reading apparatus and said structure are maintained immobile relative to each other and are mobile relative to said at least one RFID tag.

4. The method of claim 2, wherein said RFID reading apparatus is stationary and said structure is a tarpaulin of a truck, which moves with said at least one RFID tag present in said truck and wherein said at least one RFID tag is read by said RFID reading apparatus as said truck passes through said reading zone of said RFID reading apparatus.

5. The method of claim 2, wherein said structure is stationary and is enveloping said at least one RFID tag also stationary, and wherein said RFID reading apparatus is a mobile RFID reading apparatus whose reading zone is moved over said structure enveloping said at least one RFID tag.

6. The method of claim 3, wherein the distance between said structure and an emitting RFID antenna of said RFID reading apparatus is more than said operating RFID wavelength.

7. The method of claim 3, wherein said RFID antennas network comprises a same periodicity in said two dimensions.

8. The method of claim 1, wherein said at least one RFID tag is a passive tag.

9. The method of claim 1, wherein said RFID reading apparatus and said at least one RFID tag and said RFID antennas network operate in the Ultra High Frequency band between 840 MHz and 960 MHz.

10. A system for improving the reading efficiency of at least one RFID tag in a reading zone of a RFID reading apparatus at an operating RFID wavelength, the system further comprising a structure, which is essentially electrically non-conductive and which includes a RFID antennas network positioned on said structure according to a pattern whose periodicity in the two dimensions is less than half said operating RFID wavelength for creating a three dimensional interferometric pattern with peaks of electromagnetic field intensities, wherein said structure is interposed between said at least one RFID tag and said RFID reading apparatus and wherein said structure is mobile relatively to said at least one RFID tag or to said RFID reading apparatus so that said three dimensional interferometric pattern shifts and improves the reading efficiency of said at least one RFID tag when being read by said RFID reading apparatus and the position of one of said peaks of electromagnetic field intensities coincides with the position of said at least one RFID tag.

11. The system according to claim 10, wherein said RFID antennas network comprises a same periodicity in said two dimensions.

12. The system of claim 10, wherein each antenna of said RFID antennas network has an identical shape.

13. The system of claim 10, wherein said RFID reading apparatus is a stationary RFID gate and said structure is a truck tarpaulin.

14. The system of claim 13, wherein said RFID antennas are manufactured separately from the tarpaulin and then glued onto the tarpaulin.

15. The system of claim 13, wherein said RFID antennas are made of copper, aluminum, meta-materials or any other electrically conductive materials.

16. The system of claim 13, wherein said RFID antennas are printed onto the tarpaulin with conductive ink.

17. The system of claim 10, wherein said RFID reading apparatus, said at least one RFID tag and said RFID antennas network operate in the Ultra High Frequency band between 840 MHz and 960 MHz.

18. A truck tarpaulin, which structure is essentially electrically non-conductive comprising a RFID antennas network positioned on said structure according to a pattern whose periodicity in the two dimensions is less than half said operating RFID wavelength for creating a three dimensional interferometric pattern with peaks of electromagnetic field intensities, when said truck tarpaulin is placed next to a RFID reading apparatus.

19. The truck tarpaulin of claim 18, wherein said RFID antennas network comprises a same periodicity in said two dimensions.

20. The truck tarpaulin of claim 18, wherein each antenna of said RFID antennas network has an identical shape.

21. The truck tarpaulin of claim 18, wherein said RFID antennas are manufactured separately from the tarpaulin and then glued onto the tarpaulin.

22. The truck tarpaulin of claim 18, wherein said RFID antennas are made of copper, aluminum, meta-materials or any other electrically conductive materials.

23. The truck tarpaulin of claim 18, wherein said RFID antennas are printed onto the tarpaulin with conductive ink.

24. The truck tarpaulin of claim 18, wherein said RFID reading apparatus, said at least one RFID tag and said RFID antennas network operate in the Ultra High Frequency band between 840 MHz and 960 MHz.

\* \* \* \* \*